(12) United States Patent
Knowles et al.

(10) Patent No.: US 9,769,269 B2
(45) Date of Patent: *Sep. 19, 2017

(54) METHOD, SYSTEM AND DEVICE FOR SELECTING A DEVICE TO SATISFY A USER REQUEST

(71) Applicant: Imagination Technologies Limited, Kings Langley (GB)

(72) Inventors: Ian R. Knowles, Burnham (GB); Nicholas H. Jurascheck, Bushey (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,887

(22) Filed: Jan. 28, 2016

(65) Prior Publication Data

US 2016/0150031 A1    May 26, 2016

Related U.S. Application Data

(63) Continuation of application No. 13/943,064, filed on Jul. 16, 2013, now Pat. No. 9,282,154.

(30) Foreign Application Priority Data

Sep. 28, 2012  (GB) .................................. 1217429.8

(51) Int. Cl.
*G06F 15/16*  (2006.01)
*H04L 29/08*  (2006.01)
(Continued)

(52) U.S. Cl.
CPC .......... *H04L 67/16* (2013.01); *H04L 12/2818* (2013.01); *H04L 51/14* (2013.01);
(Continued)

(58) Field of Classification Search
CPC .... H04L 67/16; H04L 67/303; H04L 12/2818
(Continued)

(56) References Cited

U.S. PATENT DOCUMENTS 6,496,860 B2    12/2002  Ludtke et al.
6,970,871 B1 *  11/2005  Rayburn ................ G06Q 30/02
(Continued)

FOREIGN PATENT DOCUMENTS

JP          2003-244776 A     8/2003

*Primary Examiner* — Bryan Lee
(74) *Attorney, Agent, or Firm* — Vorys, Sater, Seymour and Pease LLP; Vincent M DeLuca

(57) ABSTRACT

Methods, systems and devices for selecting an end-user device from a plurality of end-user devices to satisfy a user request. The method comprises storing at a portal aggregator data identifying a user device group comprising a plurality of end-user devices, wherein the data identifying the device group comprises the capabilities of each end-user device. When the portal aggregator receives a request from the user the portal aggregator generates a list of end-user devices from the device group that are capable of satisfying the user request. The portal aggregator then selects an end-user device from the list of capable end-user devices and then transmits a command to the selected end-user device to satisfy the request. In some cases the list of capable end-user devices may be sorted and/or filtered prior to selecting an end-user device from the list.

17 Claims, 5 Drawing Sheets

(51) Int. Cl.
  *H04L 12/58* (2006.01)
  *H04L 12/28* (2006.01)
  *H04N 21/258* (2011.01)
  *H04W 4/02* (2009.01)

(52) U.S. Cl.
  CPC .............. *H04L 51/20* (2013.01); *H04L 51/26* (2013.01); *H04L 67/04* (2013.01); *H04L 67/10* (2013.01); *H04L 67/22* (2013.01); *H04L 67/2833* (2013.01); *H04L 67/303* (2013.01); *H04L 12/281* (2013.01); *H04N 21/258* (2013.01); *H04W 4/023* (2013.01)

(58) Field of Classification Search
  USPC ......................................................... 709/223
  See application file for complete search history.

(56) References Cited

U.S. PATENT DOCUMENTS

| | | | |
|---|---|---|---|
| 7,398,327 B2 | 7/2008 | Lee | |
| 8,340,658 B2 | 12/2012 | Tsui et al. | |
| 8,756,276 B2* | 6/2014 | Tseng | G06Q 30/0255 463/25 |
| 8,836,653 B1* | 9/2014 | Faller | G06F 3/03545 345/1.1 |
| 9,042,329 B2* | 5/2015 | Buer | H04L 12/5691 370/329 |
| 2002/0112021 A1 | 8/2002 | Detlef | |
| 2004/0187152 A1 | 9/2004 | Francis et al. | |
| 2004/0266348 A1 | 12/2004 | Deshpande et al. | |
| 2005/0114534 A1 | 5/2005 | Lee | |
| 2006/0178924 A1 | 8/2006 | Yagiura | |
| 2006/0258375 A1* | 11/2006 | Wilbrink | H04W 8/005 455/456.3 |
| 2008/0299951 A1* | 12/2008 | Karkanias | H04L 67/303 455/414.1 |
| 2009/0113088 A1 | 4/2009 | Illowsky et al. | |
| 2011/0071881 A1* | 3/2011 | Zheng | G06Q 30/02 705/7.34 |
| 2011/0085082 A1 | 4/2011 | Jing et al. | |
| 2011/0161478 A1* | 6/2011 | Formo | H04L 63/105 709/223 |

* cited by examiner

Device Group For User A — 116

| Unique ID | Description | Capabilities | Priority | Status |
|---|---|---|---|---|
| ABCD123 | Smart Phone | Phone, Messaging | | Available |
| EFGH456 | Laptop | Messaging | | Available, Battery Low |
| IJKL789 | Car Radio | Play Radio, Record Radio | 10 | Not Available |

202　204　206　208　210

222, 224, 226

Device Group For User B — 118

| Unique ID | Description | Capabilities | Priority | Status |
|---|---|---|---|---|
| IJKL789 | Car Radio | Play Radio, Record Radio | 1 | Not Available |
| MNOP123 | Stand-Alone Radio | Play Radio, Record Radio | | Available |
| QRST456 | TV | Play TV, Record TV | | Available |

METHOD, SYSTEM AND DEVICE FOR SELECTING A DEVICE TO SATISFY A USER REQUEST

BACKGROUND

Most people today have a plurality of electronic devices which can perform one or more functions (e.g. make calls, send text messages, send emails, record video, record audio etc.). Since each device can typically only perform a subset of functions, the functions that a user can perform at any one time are typically limited by the functions available on the device which is in their physical possession. Current systems do not allow a user to access the functions available via other devices.

The embodiments described below are not limited to implementations which solve any or all of the disadvantages of known systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods, systems and devices for selecting an end-user device from a plurality of end-user devices to satisfy a user request. The method comprises storing at a portal aggregator data identifying a user device group comprising a plurality of end-user devices, wherein the data identifying the device group comprises the capabilities of each end-user device. When the portal aggregator receives a request from the user the portal aggregator generates a list of end-user devices from the device group that are capable of satisfying the user request. The portal aggregator then selects an end-user device from the list of capable end-user devices and transmits a command to the selected end-user device to satisfy the request. In some cases, the list of capable end-user devices may be sorted and/or filtered prior to selecting an end-user device from the list.

A first aspect provides a method to select an end-user device from a plurality of end-user devices to satisfy a user request, the method comprising: storing at a portal aggregator data identifying a device group, the data identifying the device group comprising data identifying at least one user associated with the device group and data identifying a least one capability for each of a plurality of end-user devices associated with the device group; receiving a request at the portal aggregator from the user, the request comprising information identifying the user and information identifying an action; identifying, at the portal aggregator, the device group associated with the user based on the information identifying the user; generating, at the portal aggregator, a list of end-user devices from the identified device group having the capability to execute the action; selecting, at the portal aggregator, an end-user device from the list of end-user devices to execute the action; and transmitting a command from the portal aggregator to the selected end-user device to execute the action.

A second aspect provides a portal aggregator to select an end-user device from a plurality of end-user devices to satisfy a user request, the portal aggregator comprising: a computer storage media configured to store data identifying a device group, the data identifying the device group comprising data identifying at least one user associated with the device group and data identifying a least one capability for each of a plurality of end-user devices associated with the device group; and a processor configured to: receive a request from the user, the request comprising information identifying the user and information identifying an action; identify the device group associated with the user based on the information identifying the user; generate a list of end-user devices from the identified device group having the capability to execute the action; select an end-user device from the list of end-user devices to execute the action; and transmit a command to the selected end-user device to execute the action.

A third aspect provides a system to select an end-user device from a plurality of end-user devices to satisfy a user request, the system comprising: a data communications network; the portal aggregator of the second aspect connected to the data communications network; and the plurality of end-user devices in communication with the portal aggregator via the data communications network.

A fourth aspect provides a system to select an end-user device from a plurality of end-user devices to satisfy a user request as substantially described in reference to FIG. 1.

A fifth aspect provides a method to select an end-user device from a plurality of end-user devices to satisfy a user request as substantially described in reference to FIGS. 3 and 4.

A sixth aspect provides a portal aggregator as substantially described in reference to FIG. 5.

The methods described herein may be performed by a computer configured with software in machine readable form stored on a tangible storage medium e.g. in the form of a computer program comprising computer program code for configuring a computer to perform the constituent portions of described methods. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 2 is a schematic diagram of data identifying a device group which is stored by the portal aggregator of FIG. 1;

Figure 1:
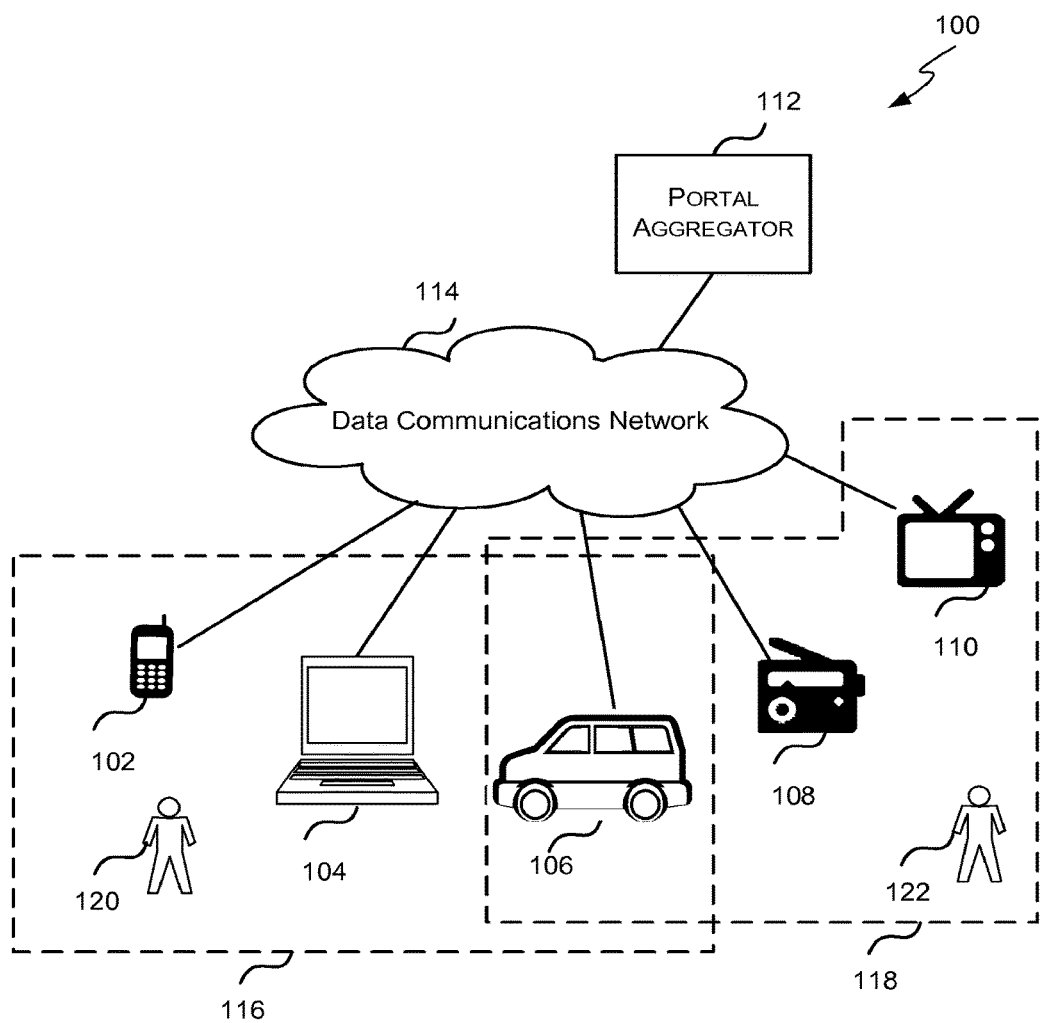
FIG. 1 is a block diagram of a system for automatically selecting an end-user device to satisfy a user request.

Common reference numerals are used throughout the figures to indicate similar features.

DETAILED DESCRIPTION

Embodiments are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Described herein are methods, systems and devices for automatically selecting one of a plurality of end-user devices to satisfy a request from a user. Specifically, the systems, methods and devices described herein allow users to group end-user devices into device groups. One or more of the end-user devices in a device group may be remotely located from the user and/or one another. Upon receiving a request from a user, the system selects an appropriate end-user device from the device group associated with the user to satisfy the request. The selection may be based on the capabilities of the end-user devices. The system then issues a command to the selected end-user device to satisfy the request.

Reference is now made to FIG. 1 which illustrates a system 100 for automatically selecting an end-user device from a plurality of end-user devices to satisfy a request received from a user. The system 100 comprises a plurality of end-user devices 102, 104, 106, 108 and 110 that each have one or more capabilities; a portal aggregator 112 for (i) allowing users to group their end-user devices, and (ii) selecting and controlling an appropriate end-user device from a group of end-user devices to satisfy a request received from a user; and a data communications network 114 for allowing the plurality of end-user devices 102, 104, 106, 108 and 110 to communicate with the portal aggregator 112.

The end-user devices 102, 104, 106, 108 and 110 are computer-based devices that may perform one or more functions. The functions that can be performed by any particular end-user device are defined by the capabilities of the device. Capabilities may include, but are not limited to, phone capabilities, messaging capabilities (e.g. text messaging and/or email messaging), radio recording capabilities, video camera recording (e.g. via a security camera). and television recording capabilities. One or more of the end-user devices may be a car radio 106, a stand-alone radio 108 (i.e. a DAB radio), a smart phone 102, a television 110, a personal computer 104, a tablet computer, a multifunctional home audio device (e.g. a home stereo system), a camera (e.g. a security camera), an intercom system, wired or wireless speakers, a LAMP server or an information aggregator device.

Each end-user device 102, 104, 106, 108 and 110 has the ability to communicate with the portal aggregator 112 via the data communications network 114.

In some cases the end-user devices 102, 104, 106, 108 and 110 may be all from the same vendor. In other cases, at least one of the end-user devices 102, 104, 106, 108 or 110 is from a different vendor than another end-user device. Although the system 100 of FIG. 1 shows five end-user devices 102, 104, 106, 108 and 110 it will be evident to a person of skill in the art that the principles described herein may be applied to systems with more or fewer end-user devices.

The portal aggregator 112 is a computer-based device or a group of computer-based devices that receives requests from users, selects the appropriate end-user device to satisfy the request and issues a command to the selected end-user device to satisfy the request. Specifically, the portal aggregator 112 allows users to group end-user devices into device groups. Once a device group has been created, if the portal aggregator 112 receives a request from a user (e.g. via an end-user device 102, 104, 106, 108 or 110 or via another device) via the data communications network 114, the portal aggregator 112 selects the appropriate device from the device group associated with the user, and issues a command via the data communications network 114 to the selected end-user device to satisfy the request.

In some cases, each device group is associated with a single user. For example, FIG. 1 shows two device groups 116 and 118. The first device group 116 is associated with a first user 120 and comprises three end-user devices 102, 104 and 106. The second device group 118 is associated with a second user 122 and comprises three end-user devices 106, 108 and 110. When the portal aggregator 112 receives a request from the first user 120, the portal aggregator 112 selects an end-user device from the first device group 116 to satisfy the request. Similarly, when the portal aggregator 112 receives a request from the second user 122, the portal aggregator 112 selects an end-user device from the second device group 118 to satisfy the request.

In other cases, a device group may be associated with a plurality of users. In these cases when the portal aggregator 112 receives a request from any of the users associated with the group, the portal aggregator 112 selects an end-user device from the shared device group to satisfy the request. This allows groups of users, such as a husband and wife, to share and have control over all of their end-user devices irrespective of who owns an end-user device or who has possession of an end-user device at any time.

In some cases, each end-user device 102, 104, 106, 108 and 110 may only be assigned to one device group. In other cases, as shown in FIG. 1, each end-user device 102, 104, 106, 108 and 110 may be assigned to more than one device group. For example, end-user device 106 is assigned to the first and second device groups 116 and 118. This allows individual end-user devices to be shared between users. Where end-user devices can be shared by users in this manner the end-user devices may be assigned a priority ranking that indicates the priority of the device within the device group. For example, a high priority may indicate that the end-user device should be used first (if appropriate for the task) and a low priority may indicate that the end-user device should only be used if there are no other suitable end-user devices. The priorities may vary per group. For example, one device group may have a particular end-user device with a high priority, whereas another device group may have the same end-user device with a low priority. This allows an end-user device to be configured as a primary end-user device for a first user and as a backup end-user device for a second user.

To create a device group the user provides the portal aggregator 112 with end-user device information for each end-user device to be part of the device group. The end-user device information may comprise one or more of: information uniquely identifying the end-user device, the capabilities of the end-user device, an indication of which device group the end-user device is to be part of, and priority information.

Information uniquely identifying the end-user device may, for example, be the end-user device's MAC (Media Access Control) address, serial number, internal hardware ID, NFI (Near Field ID); or data generated from any of the items previously listed or information provided by the user (e.g. Passport Number or National Insurance Number). The serial number may be applied to the exterior of the product during manufacture whereas the internal hardware ID may be generated by the hardware and may be readable by software installed on the device.

The capabilities information may, for example, be provided to the portal aggregator 112 as a list of predefined capabilities codes or as an alphanumeric description of the capabilities. The information uniquely identifying the device group may, for example, be a unique number assigned to the user by the portal aggregator 112. The priority information may specify the priority that the end-user device is to be. The priority information may comprise a numerical value (e.g. a number from 1 to 10) or an alphanumeric description (e.g. high or low).

In some cases, the end-user device information may be manually provided to the portal aggregator 112 by the user. For example, the user may access (via an end-user device or another device) the portal aggregator 112 via the data communications network 114 via a web browser such as Internet Explorer™ or Safari™ and manually enter the end-user device information via the web browser. In other cases, the end-user device information may be provided to the portal aggregator 112 by the end-user devices 102, 104, 106, 108 and 110. For example, one or more end-user devices 102, 104, 106, 108 or 110 may comprise an application that is configured to send the end-user device information. The transmission of the end-user device information from the application may be triggered by the user or may be automatic. For example, the application may be configured to transmit the end-user device information upon receiving the information identifying the device group (e.g. the user's unique ID) from the user. An exemplary method for creating a device group is described in reference to FIG. 3.

In some cases, one or more end-user devices 102, 104, 106, 108 or 110 may be configured to provide the portal aggregator 112 with additional end-user device information either on a one-time basis or on a periodic basis. For example, one or more end-user devices 102, 104, 106, 108 or 110 may be configured to periodically send the portal aggregator 112 status information. The status information may include information such as, but not limited to, battery status, availability status (e.g. the availability status may indicate whether user device is powered off, in use by another user, it is already performing an action (e.g. recording) or has no radio and/or television reception). In another example, one or more end-user devices 102, 104, 106, 108 or 110 may be configured to send the portal aggregator 112 geographic location information (e.g. information indicating where the end-user device is currently located). In yet another example, end-user devices that have a data storage module for storing data may be configured to transmit the current storage space available in their data storage module to the portal aggregator 112 on a periodic basis. In yet another example, one or more end-user devices 102, 104, 106, 108, 110 may be configured to send the portal aggregator 112 information indicating the signal level for a radio and/or television signal on a periodic basis. In yet another example, end-user devices that use a paid or subscription service may be configured to transmit the current credits available for the particular service.

Once the end-user device information has been received from the end-user devices the portal aggregator 112 associates each end-user device with the appropriate device group. In some cases associating an end-user device with the appropriate device comprises storing the end-user device information for that particular end-user device in association with the device group. An example of the device group data stored by the portal aggregator 112 is described in reference to FIG. 2.

The portal aggregator 112 may be configured to allow end-user devices to be added and/or removed from a device group on an ad-hoc or dynamic basis.

Once a device group has been created the portal aggregator 112 listens for requests from the user. Upon receiving a request from the user, the portal aggregator 112 determines the device group associated with the user and then selects an appropriate end-user device from the device group to satisfy the request.

The request may comprise information identifying the user and information identifying an action to be completed. An action is an activity that can be completed by one or more of the end-user devices based on its capabilities. For example, actions may include, but are not limited to: call person A; text person B; record radio program C; and, record television program D.

In some cases, the request may also comprise secondary identifying information and a secondary action. Specifically, in some cases the system 100 may be configured to allow the user to specify an action to be completed using one of his/her end-user devices, and an action to be completed using another user's end-user devices. For example, the system 100 may allow a user to specify that a video or radio recording is not only to be stored on the user's end-user devices but also on another user's end-user devices. For example, a user may determine that the program that they are recording would also be of interest to a friend or relative and so may send a request that comprises secondary information identifying the friend and a secondary action to record the program of interest on the friend's end-user devices. In some cases the user may only be able to request a secondary action to be completed on another user's end-user device if the user is a "trusted" user of the other user (e.g. the user must have been given permission by the other user to request actions be completed on the other user's end-user devices). The concept of a "trusted" user will be described in more detail in reference to FIG. 3.

The portal aggregator 112 selects an appropriate end-user device from the device group to satisfy the request based on the capabilities of the end-user devices in the device group. For example, if the action is to call person A, the portal aggregator 112 may select an end-user device that has calling capabilities. Similarly, if the action is to record radio program C, the portal aggregator 112 may select an end-user device that has radio recording capabilities.

In some cases, the portal aggregator 112 may also use other information to select the appropriate end-user device from the device group. For example, as described above, the end-user devices may be configured to transmit status information to the portal aggregator 112 on a periodic basis. The portal aggregator 112 may then use the status information to select an appropriate end-user device. For example, if the status information indicates that the end-user device is not available (e.g. it is being used by another user, it has been turned off, or it is no longer providing regular updates to the portal aggregator 112) or is suffering from a problem (e.g.

low battery) the portal aggregator 112 may decide not to select this end-user device if there is an alternative device with suitable capabilities.

In another example, the end-user device information may provide the portal aggregator 112 information about its geographic location. The portal aggregator may 112 then use the geographic location information to select an appropriate device. For example, if the action specified in the request is to record the radio station the user is currently listening to, then the portal aggregator 112 may select a radio recording capable end-user device that is in the same general area as the user to ensure that the end-user device is capable of receiving the same radio station as the user.

Figure 4:
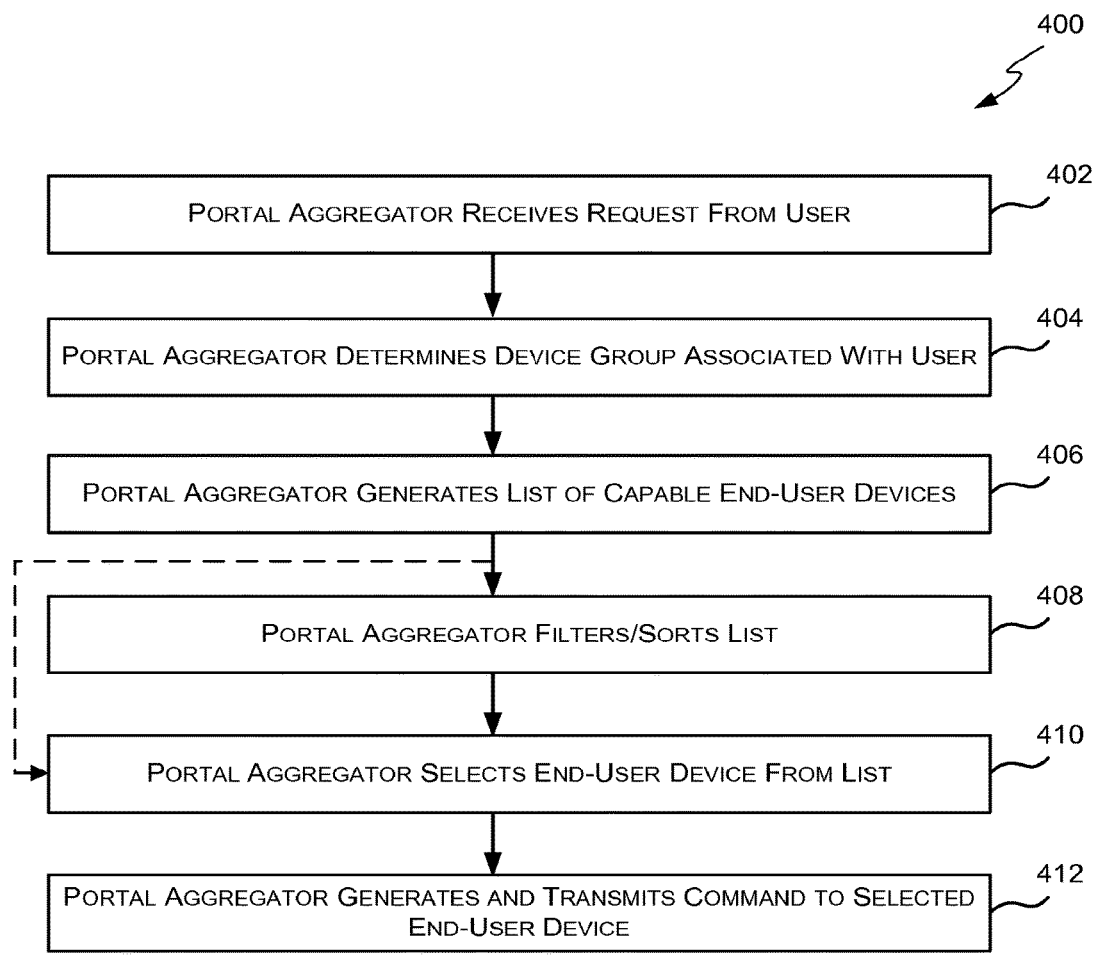
FIG. 4 is a flowchart of a method for selecting an end-user device to satisfy a user request using the system of FIG. 1.

An exemplary method for selecting a device to satisfy a user request is described in reference to FIG. 4.

Once the portal aggregator 112 selects an end-user device from the device group, the portal aggregator 112 issues a command to the selected end-user device via the data communications network 114 to execute the action specified in the user request. Upon receiving the command, the end-user device executes the action. For example, in some cases the end-user devices 102, 104, 106, 108 and 110 may comprise an application that is configured to receive commands from the portal aggregator 112 and control the end-user device in the same way as if the end-user device had received the command from the user directly (e.g. via a key press or menu selection).

The data communications network 114 may be any network, or combination of networks, capable of enabling data communication between the other devices in the system 100. For example, the data communications network 114 may be a public switched telephone network (PSTN), a mobile telephone network, a wireless data network, a wired data network, or any combination thereof.

Although a single data communications network 114 is shown, it will be evident to a person of skill in the art that the data communications network 114 may comprise a plurality of connected data communications networks or a plurality of separate and independent data communications networks. Different end-user devices may use different aspects of the data communications network 114 to communicate with the portal aggregator 112. For example, one end-user device may communicate with the portal aggregator 112 using a mobile communications aspect of the data communications network 114 and another end-user device may communication with the portal using the Internet aspect of the data communications network 114.

The system 100 of FIG. 1 allows users to initiate execution of a plurality of actions from anywhere using any device that can communicate with the portal aggregator 112. The user does not need to have physical access to the particular executing device to be able to execute an action.

For example, the system 100 of FIG. 1 may be used when a user is listening to a radio program in a car, but they have to leave the car before the program has ended. The system 100 described herein may be used to group the car radio with a radio recording device located elsewhere. Then before leaving the car the user can issue a request, via the car radio, to the portal aggregator 112 to record the remainder of the radio program. The portal aggregator 112 may then look at the end-user devices in the device group for the user and see that there is a device capable of recording radio. The portal aggregator 112 may then transmit a command to the radio recording device to start recording the specified radio program.

In another example, the system 100 of FIG. 1 may be used when a user is listening to a radio program in a car and they wish to record the program that they are currently listening to or a program in the future, but their car radio does not have recording capabilities. The system 100 described herein may be used to group the car radio with a radio recording device located elsewhere. The user can then issue a request, via the car radio, to the portal aggregator 112 to record the radio program they are currently listening to or a program in the future. The portal aggregator 112 may then look at the end-user devices in the device group for the user and see that there is a device capable of recording radio. The portal aggregator 112 may then transmit a command to the radio recording device to initiate a timed recording of the specified program. The portal aggregator 112 may use Electronic Program Guide (EPG) data obtained from a third party to determine the program start and/or end times.

In some cases, the system 100 may comprise a back-up portal aggregator (not shown) that is located in a place associated with the user (e.g. the user's home or business). The back-up portal aggregator may be in communication with the main portal aggregator 112 via the data communications network 114 on a periodic basis to ensure that the backup portal aggregator has an up-to-date copy of the device group information for the user. Then, if the main portal aggregator 112 is inaccessible, the user may access the back-up portal aggregator to control any end-user device in communication with the back-up portal aggregator.

Reference is now made to FIG. 2 which shows a schematic diagram of data identifying a device group which is stored by the portal aggregator 112. Specifically FIG. 2 shows the data identifying a device group for each of the two device groups 116 and 118 shown in FIG. 1. The first device group 116 is associated with a first user 120 ("User A") and the second device group 118 is associated with a second user 122 ("User B").

Each device group 116 and 118 has a plurality of columns for storing end-user device information. In FIG. 2 each device group 116 and 118 has five columns 202, 204, 206, 208, 210, 212, 214, 216, 218 and 220 for storing end-user device information, although it will be evident to a person of skill in the art that the device groups may have more or fewer columns depending on the end-user device information received. Specifically, in FIG. 2 each device group 116 and 118 comprises a unique ID column 202 and 212 for storing the unique IDs of each end-user device, a description column 204 and 214 for storing a brief description of each end-user device, a capabilities column 206 and 216 for storing capabilities information for each end-user device, a priority column 208 and 218 for storing the priority information for each end-user device (if provided), and a status column 210 and 220 for storing the status information for each end-user device.

As described above in reference to FIG. 1, the unique ID may be the end-user device's MAC address, serial number, internal hardware ID or NFI; or may be based on the end-user device's MAC address, serial number, internal hardware ID, NFI or a combination thereof.

The description provides a brief description of the end-user device. The brief description may be provided to the portal aggregator 112 as part of the end-user device information or it may be manually entered by the user after the end-user device has been added to the device group.

The capabilities represent what functions the end-user device is capable of performing. When a request is received from a user the capability information is used to determine which devices may be used to satisfy the request. In some cases the capabilities may be represented by an alphanumeric description as shown in FIG. 2. In other cases the capabilities may be represented by codes that are matched to a predefined list of capability codes.

The priority represents the rank of the end-user device within the group. The higher the priority the more the user wants that end-user device to be used if suitable. Conversely, the lower the priority the less the user wants that end-user device to be used if suitable. Specifically, as described above, where an end-user device belong to two device group (e.g. end-user device 106 belongs to both the first and second device groups 116 and 118) the end-user device may be given a priority for each group that it belongs. This allows the end-user device to be a primary end-user device (e.g. used regularly) for one user and backup end-user device (e.g. used only occasionally or where necessary) for another user. In some cases, as shown in FIG. 2, the priority may be represented by a numerical value (e.g. 1 to 10) where a higher number indicates a higher priority and a lower number represents a lower priority. In other cases, the priority may be represented by an alphanumeric description (e.g. "high priority" or "low priority").

The status represents the current status (if available) of the end-user device. Specifically, as described above, some end-user devices may be configured to periodically transmit status information which may include, but is not limited to, battery status and/or availability status.

Each device group 116 and 118 comprises a plurality of rows 222, 224, 226, 228, 230 and 232 where each row represents an end-user device that is part of or associated with the device group 116 or 118. Specifically, since each device group 116 and 118 comprises three end-user devices 102, 104 and 106, and 106, 108 and 110 and each device group 116 and 118 comprises three rows, one for each end-user device. Specifically, the first device group 116 comprises a first row 222 for end-user device information for the first end-user device 102, a second row 224 for end-user device information for the second end-user device 104, and a third row 226 for end-user device information for the third end-user device 106. Similarly, the second device group 118 comprises a first row 228 for end-user device information for the third end-user device 106, a second row 230 for end-user device information for the fourth end-user device 108, and a third row 232 for end-user device information for the fifth end-user device 110.

Although FIG. 2 shows the data identifying a device group being stored in a table format, it will be evident to a person of skill in the art that the data identifying a device group may be stored and/or presented using any suitable format.

Figure 3:
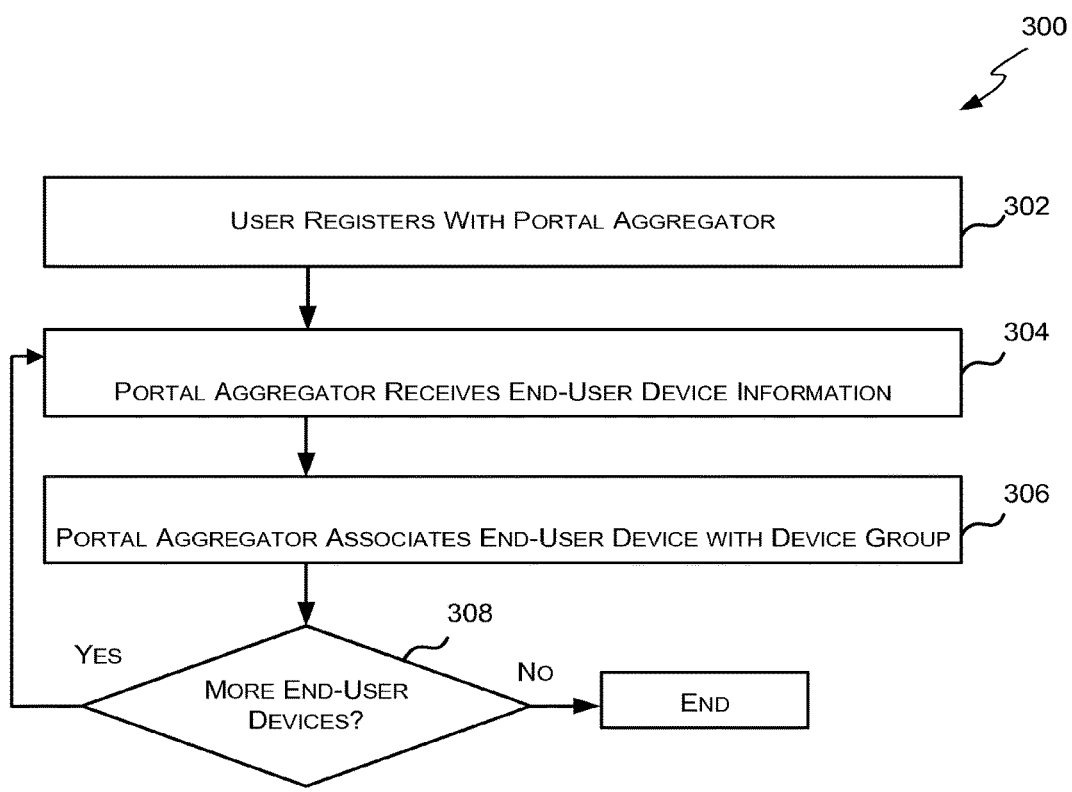
FIG. 3 is a flowchart of a method for generating a device group using the system of FIG. 1.

Reference is now made to FIG. 3 which illustrates an exemplary method 300 for generating a device group using the system 100 of FIG. 1. At step 302 the user registers with the portal aggregator 112. In some cases registering may comprise accessing the portal aggregator 112 and providing the portal aggregator 112 with information about the user. The information about the user may include the user's name, email address, mobile telephone, home telephone, work telephone, work address and/or home address. The portal aggregator 112 then generates a device group for the user and provides the user with a unique user ID. The portal aggregator 112 may also be configured to provide the user with other information such as a username and password which may be used to access and/or manage the device group once it has been established.

In some cases, the user may have the option of adding one or more additional users to the device group. In these cases each additional user may be assigned their own unique user ID which is associated with the device group.

In some cases, the user may have the option of specifying one or more "trusted" users. The user may specify the trusted user by name or by unique user ID. Once a user has been marked as a trusted user of a primary user they are allowed to request actions to be completed on the primary user's end-user devices. Specifically, as described in reference to FIG. 1, the trusted user may be able to request that a secondary action be completed on an end-user device in the primary user's device group. For example, a father (the trusted user) may decide that a program that he wants to record would be of interest to his son (the primary user). The father may then generate a request comprising a primary action to record a television program on the father's end-user devices and a secondary action to record the television program on his sons' end-user devices.

The user may access the portal aggregator 112 to complete the registration via the data communications network 114 using any end-user device 102, 104, 106, 108 or 110 or any other suitable device. For example, the user may access the portal aggregator 112 using a web-browser such as Internet Explorer™ or Safari™ loaded on the device.

Once the user has registered with the portal aggregator 112 the method 300 proceeds to step 304.

At step 304, the portal aggregator 112 receives end-user device information for an end-user device to be added to the device group. The end-user device information may comprise, for example, information uniquely identifying the end-user device, the capabilities of the end-user device, an indication of which device group the end-user device is to be part of, and/or priority information. In some cases, the information uniquely identifying the end-user device may be or may be based on the end-user device's MAC address or serial number. In some cases the portal aggregator 112 may be configured to use the MAC address or serial number to generate a new unique identifier. The capabilities of the end-user device define what actions the end-user device may execute. The capabilities may include things such as, but not limited to: messaging capability (e.g. email capability and/or text messaging capability), calling capability, radio recording capability, video camera recording capability, television recording capability etc.

In some cases, the end-user device information may be manually provided to the portal aggregator 112 by the user. For example, after the user has registered with the portal aggregator in step 302, the user may manually enter the end-user device information via the web browser.

In other cases, the end-user device information may be provided to the portal aggregator 112 by the end-user devices 102, 104, 106, 108 and 110. For example, each end-user device may comprise an application that is configured to send the end-user device information to the aggregator portal 112 upon receiving device group identification information from the user. For example, the user may manually input their unique ID into the application which triggers the application to send the end-user device information to the portal aggregator 112. In some cases the application may be configured to transmit the end-user device information to the portal aggregator 112 over the data communications network 114 using a known protocol, such as NFC (Near Field Communication) or uPnP (Universal Plug and Play). Both of these protocols use a document based system for exchanging information. For example, uPnP uses XML (Extensible Markup Language) documents and NFC uses JSON (JavaScript Object Notation) documents.

At step 306, the portal aggregator 112 associates or links the end-user device with the appropriate device group. In some cases associating or linking the end-user device with the appropriate device group comprises using the information identifying the device group (e.g. the user's unique ID) to identify the appropriate device group, and storing the end-user device information for the specific end-user device in association with the appropriate device group.

At step 308, the portal aggregator 112 determines whether there are more devices to be added to the device group. If the portal aggregator 112 determines that there are more end-user devices to be added to the device group then the method proceeds back to step 304. If, however, the portal aggregator 112 determines that there are no more end-user devices to be added to the device group then the method 300 ends.

Reference is now made to FIG. 4 which illustrates an exemplary method 400 for selecting an end-user device to satisfy a request received from a user using the system of FIG. 1. At step 402 the portal aggregator 112 receives a request from a user via the data communications network 114. The user may use one of the end-user devices 102, 104, 106, 108 or 110 or another device to transmit the request to the portal aggregator 112. For example, the user may access the portal aggregator 112 using a web browser, such as Internet Explorer™ and Safari™, running on a device and may issue the request via the web browser. In another example, the user may issue the command from the interface of an end-user device. For example, the user may issue a record radio program request from the interface on a radio.

As described above in relation to FIG. 1, the request may comprise information identifying the user and/or information identifying an action to be completed by an end-user device 102, 104, 106, 108 or 110. The information identifying the user may, for example, comprise the user's name, a unique identifier (e.g. customer number) or any other suitable identifying information (e.g. the mobile phone number of the device generating the request, or the unique ID of the end-user device generating the request where the request is generated by one of the end-user devices in the device group). The information identifying an action may, for example, comprise a code that specifies a specific action, or an alphanumeric description of the action. Once the portal aggregator 112 receives the user request, the method 400 proceeds to step 404.

At step 404, the portal aggregator 112 determines the device group associated with the user identified in the request. For example, the portal aggregator 112 may use the information identifying the user to locate the device group associated with the user. Once the portal aggregator 112 has determined the device group associated with the user identified in the request, the method 400 proceeds to step 406.

At step 406, the portal aggregator 112 generates a list of end-user devices in the device group that are capable of satisfying the user request. For example, the portal aggregator 112 may compare the action identified in the request against the capabilities of the end-user devices in the device group and generate a list of the end-user devices in the device group that are capable of performing the action identified in the request. For example, if the action is to call person A, the portal aggregator 112 may generate a list of end-user devices from the device group that have calling capabilities. Similarly, if the action is to record radio program C, the portal aggregator 112 may generate a list of end-user devices from the device group that have radio recording capabilities.

In some cases, the portal aggregator 112 may be configured to analyze the action before generating the list of capable end-user devices. For example, where the action is to record a radio program, the portal aggregator 112 may first determine whether the identified radio program is a broadcast of a pre-recorded program. For example, the portal aggregator 112 may search a local or third party database of recorded programs. Examples of third parties that may operate such databases include private and public broadcasting services, such as the BBC (British Broadcasting Corporation) and 4oD (4 On Demand), and Internet providers of media content, such as NetFlix™ and LoveFilm™. If the portal aggregator 112 determines that the identified radio program is a broadcast of a pre-recorded program, the portal aggregator 112 may generate a list of devices that have storage capabilities. If, however, the portal aggregator 112 determines that the identified radio programme is not a broadcast of a pre-recorded program, but is a live program, the portal aggregator 112 may generate a list of end-user devices that have radio recording capabilities.

In some cases, once the list of capable end-user devices has been generated the method 400 proceeds to step 408. In other cases, once the list of capable end-user devices has been generated the method 400 proceeds directly to step 410. Accordingly, step 408 is an optional step.

At step 408, the portal aggregator 112 filters and/or sorts the list of capable end-user devices generated in step 406 using one or more criteria. The one or more criteria may comprise, but is not limited to: the status of the end-user devices, the geographic location of the user and/or end-user devices, the storage space of the end-user devices, the priority of the end-user devices, the quality of a radio and/or television signal at the end-user devices, the availability of paid services, and the suitability of the platform for the content.

For example, as described above, the end-user devices may be configured to transmit status information to the portal aggregator 112 on a periodic basis. The portal aggregator 112 may be configured to use the status information to sort and/or filter the list of capable end-user devices generated in step 406. For example, the portal aggregator 112 may be configured to remove any end-user devices from the list of capable end-user devices if their status information indicates that the end-user device is not available or is suffering from a problem (e.g. low battery). Where the end-user device is shared by multiple users, the device may be unavailable because it is currently being used by another user. The portal aggregator 112 may alternatively, or in addition, be configured to rank the list of capable end-user devices based on their status.

In another example, the end-user devices may be configured to transmit geographic location information to the portal aggregator 112 during initial set-up or periodically (if the end-user device is portable). The portal aggregator 112 may be configured to use the geographic location information to filter and/or sort the list of capable end-user devices. For example, if the action specified in the request is to record the radio program the user is currently listening to, the portal aggregator 112 may be configured to remove any end-user device from the list of capable end-user devices that is not in the same general area as the user. This ensures that the portal aggregator 112 does not select an end-user device that is not geographically capable of receiving the same radio station as the user. The portal aggregator 112 may alternatively, or in addition, be configured to rank the list of capable end-user devices based on their geographic location.

In yet another example, end-user devices that have a data storage module for storing data may be configured to transmit the storage space available of their data storage module to the portal aggregator 112 on a periodic basis. The portal aggregator 112 may be configured to use the storage space information to filter and/or sort the list of capable end-user devices. For example, if the action specified in the request is to record a television program, the portal aggregator 112 may be configured to remove from the list of capable end-user devices any end-user devices that have less storage space than a predetermined amount. The predetermined amount may be based on the television program that is to be recorded. The portal aggregator 112 may alternatively, or in addition, be configured to rank the list of capable end-user devices based on their storage space available. For example, the end-user devices with higher or more storage space may be ranked higher and the end-user devices with lower or less storage space may be ranked lower.

In yet another example, the user may provide priority information for one or more end-user devices in the device group. For example, as described above in reference to FIG. 1, the portal aggregator 112 may be configured to receive and store priority information for end-user devices. A higher priority may indicate that an end-user device is to be used first if possible, and a lower priority may indicate that the end-user device is only to be used if there are no other suitable end-user devices available. This may be particularly useful where the end-user device is to be shared by two users in such a manner that it is to be a primary end-user device for one user, but only a backup end-user device for the other user. The portal aggregator 112 may be configured to use the priority information to filter and/or sort the list of capable end-user devices. For example, the portal aggregator 112 may be configured to remove any end-user devices from the list of capable end-user devices that have a priority value less than a predetermined value. Alternatively, or in addition, the portal aggregator 112 may be configured to rank the list of capable end-user devices based on their priority. For example, the end-user devices with a higher priority may be ranked higher and the end-user devices with lower priority values may be ranked lower.

In yet another example, end-user devices that receive radio and/or television signals may be configured to transmit information indicating the quality of the received radio and/or television signal to the portal aggregator 112 on a periodic basis. The portal aggregator 112 may be configured to use the signal quality information to filter and/or sort the list of capable end-user devices. For example, if the action specified in the request is to record a radio program, the portal aggregator 112 may be configured to remove from the list of capable end-user devices any end-user devices that do not have a certain quality of signal for the specified radio station. The portal aggregator 112 may alternatively, or in addition, be configured to rank the list of capable end-user devices based on the quality of the signal for the specified radio station.

In yet another example, end-user devices that use paid or subscription services may be configured to provide the portal aggregator 112 with information on the credits available for the paid service on a periodic basis. The portal aggregator 112 may be configured to use paid service credit information to filter and/or sort the list of capable end-user devices. For example, if the requested action requires a paid or subscription service (e.g. if the action is to record a subscription radio or television channel) and the list of capable end-user devices comprises end-user devices with different amounts of credit available (e.g. the end-user devices are owned by different individuals) then the portal aggregator 112 may be configured to remove from the list of capable end-user devices any end-user device that does not have at least a predetermined amount of credit available. The predetermined amount may, for example, be based on the cost of executing the requested action.

In yet another example, the portal aggregator 112 may be configured to filter and/or sort the list of capable end-user devices based on the suitability of the device for the specific content. For example, if the requested action is to record a particular radio program (e.g. a DAB radio program) the portal aggregator 112 may be configured to remove from the list of capable end-user devices any end-user devices that are not capable of receiving the radio station on which the radio program is being broadcast.

Once the list of capable end-user devices has been filtered and/or sorted the method 400 proceeds to step 410.

At step 410, the portal aggregator 112 selects one of the capable end-user devices to execute the action specified in the request. If there are no end-user devices in the capable end-user device list (e.g. there are no end-user devices in the user's device group that are capable of satisfying the request) the portal aggregator 112 may be configured to send the requesting end-user device an error message. The end-user device may then display or otherwise output the error message to the user.

Where there is only one end-user device in the capable end-user device list the portal aggregator 112 may be configured to select that end-user device. Where, however, there are at least two end-user devices in the capable end-user device list, the portal aggregator 112 may be configured to select one of the end-user devices from the list using one or more of the following techniques.

A first exemplary technique that may be used by the portal aggregator 112 comprises randomly selecting one of the end-user devices from the capable end-user device list. This technique may be used, for example, where the capable end-user device list has not been sorted or ranked to implement load balancing between the end-user devices.

A second exemplary technique that may be used by the portal aggregator 112 comprises selecting the end-user device at the top or end of the list of capable end-user devices. This technique may be used, for example, where the list of capable end-user devices has been or sorted or ranked as described in step 408.

A third exemplary technique that may be used by the portal aggregator 112 comprises selecting an end-user device from the list of capable end-user devices based on the user's pattern. For example, the portal aggregator 112 may be configured to receive user information (e.g. the user's geographic location) from the user on a periodic or regular basis. The portal aggregator 112 may be configured to monitor the user's behavior and develop a daily pattern for the user. The portal aggregator 112 may be configured to use the daily pattern information to select an end-user device from the list of capable end-user devices. For example, if the user typically leaves work at 5 pm and then arrives home at 6:00 pm and the portal aggregator 112 receives a radio recording request from the user at 5:30 pm the portal aggregator 112 may be configured to select a radio recording device at the user's home on the assumption that the user will want to listen to it when they arrive home.

Once the portal aggregator 112 has selected one of the end-user devices from the list of capable end-user devices the method 400 proceeds to step 412.

At step 412, the portal aggregator 112 generates and transmits a command to the end-user device selected in step 410 to execute the action specified in the request. Generating the command may comprise generating and formatting a command suitable for the selected device. The correct format may be based on the type, make and/or model of the selected end-user device. In some cases the command may conform to a known standard, such as uPnP.

Once the command has been generated it is transmitted to the selected end-user device using any suitable means. For example, the portal aggregator 112 may transmit the command to the selected end-user device via the data communications network 114. In some cases the command is transmitted to the selected end-user device using a known protocol such as uPnP.

Upon receiving the command the selected end-user device executes the specified action. For example, where the action in the request is to record radio program C, upon receiving the appropriate command from the portal aggregator 112 the selected end-user device may record the identified radio program. In some cases the selected end-user device may also be configured to transmit feedback to the portal aggregator 112 either confirming execution of the command or indicating that the end-user device encountered an error in executing the command.

Where the request comprises a secondary action (e.g. an action to be completed on another user's device), steps 404 to 412 may be repeated for the secondary action. In some cases, in addition to sending the command to execute the secondary action to the selected end-user device, the portal aggregator 112 may be configured to also transmit information identifying the requestor. Upon receiving this additional information the selected end-user device may display a message to the user asking them to confirm whether the end-user device should execute the requested command. For example, the message may be something like: "John Smith wants you to record Program X, do you want to continue?" In these cases, only if the user confirms execution will execution of the command be completed by the end-user device.

Figure 5:
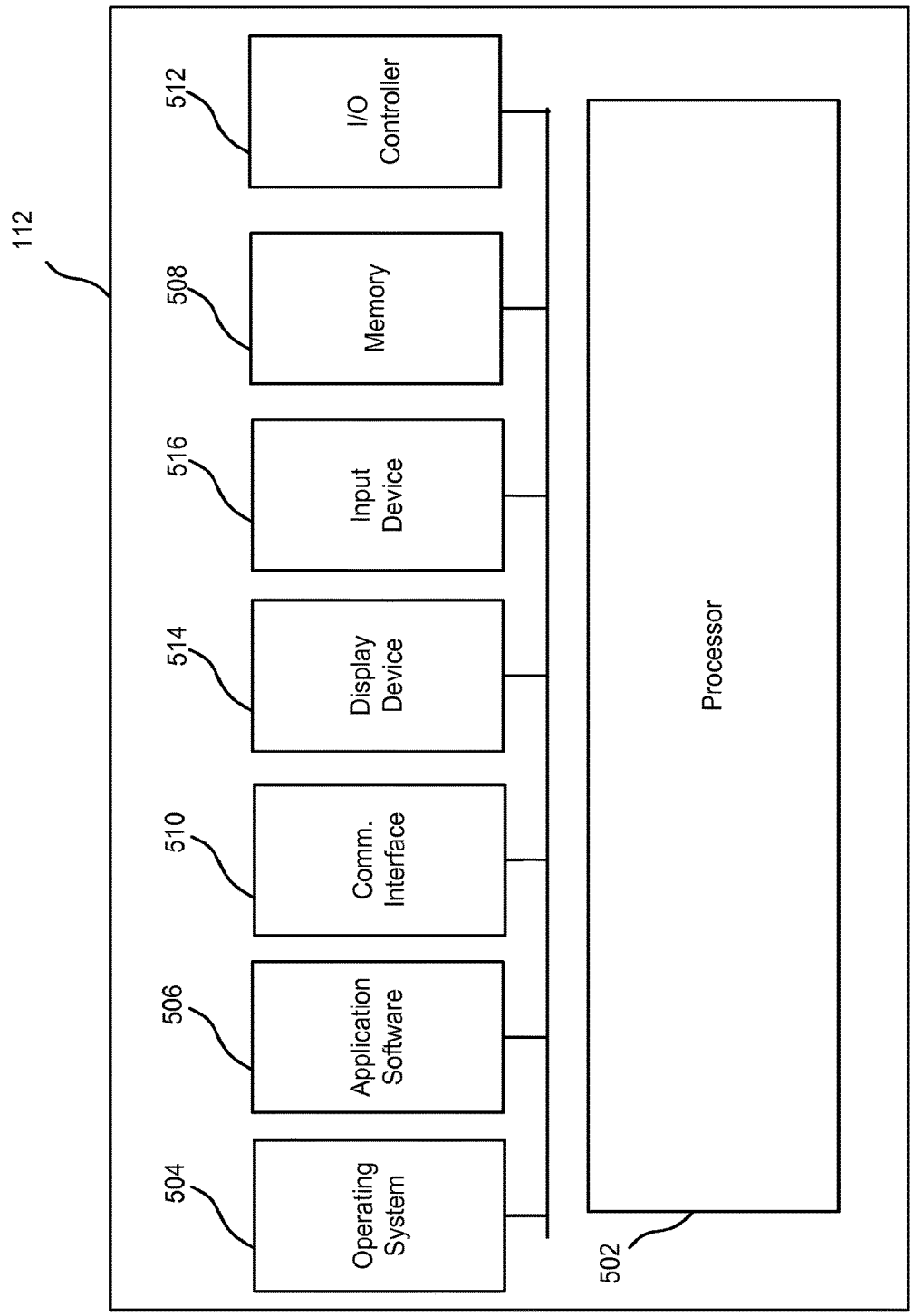
FIG. 5 is a block diagram of an exemplary portal aggregator of FIG. 1.

Reference is now made to FIG. 5 which illustrates a portal aggregator 112 which may be implemented as any form of a computing and/or electronic device, and in which embodiments of the foregoing description may be implemented.

The portal aggregator 112 comprises one or more processors 502 which may be microprocessors, controllers or any other suitable type of processors for processing computer executable instructions to control the operation of the device in order to run applications. In some examples, for example where a system on a chip architecture is used, the processors 502 may include one or more fixed function blocks (also referred to as accelerators) which implement a part of the method of operation of the portal aggregator 112 or applications described herein in hardware (rather than software or firmware). Platform software comprising an operating system 504 or any other suitable platform software may be provided at the portal aggregator 112 to enable application software 506 to be executed on the device.

The computer executable instructions may be provided using any computer-readable media that is accessible by the portal aggregator 112. Computer-readable media may include, for example, computer storage media such as memory 508 and communications media. Computer storage media, such as memory 508, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 508) is shown within the portal aggregator 112 it will be appreciated that the storage may be distributed or located remotely and accessed via a network or other communication link (e.g. using communication interface 510).

The portal aggregator 112 also comprises an input/output controller 512 arranged to output display information to a display device 514 which may be separate from or integral to the portal aggregator 112. The display information may provide a graphical user interface. The input/output controller 512 is also arranged to receive and process input from one or more devices, such as a user input device 516 (e.g. a mouse or a keyboard). In an embodiment the display device 514 may also act as the user input device 516 if it is a touch sensitive display device. The portal aggregator 112 may also be provided with other functionality as is known for such devices.

The term 'processor' and 'computer' are used herein to refer to any device with processing capability such that it can execute instructions. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional blocks or operations.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method to select an end-user device from a plurality of end-user devices to satisfy a user request, the method comprising:
    storing at a portal aggregator data identifying a plurality of device groups, the data identifying each device group comprising data identifying at least one user associated with the device group and data identifying a least one capability for each of a plurality of end-user devices associated with the device group;
    receiving a request at the portal aggregator from the user, the request comprising information identifying the user, information identifying a first action, information identifying another user, and information identifying a second action;
    identifying, at the portal aggregator, a first device group associated with the user based on the information identifying the user, and a second device group associated with the other user based on the information identifying the other user;
    generating, at the portal aggregator, a first list of end-user devices from the first device group having the capability to execute the first action, and a second list of end-user devices from the second device group having the capability to execute the second action;
    selecting, at the portal aggregator, an end-user device from the first list of end-user devices to execute the first action and an end-user device from the second list of end-user devices to execute the second action based on a location pattern associated with the user; and
    transmitting a command from the portal aggregator to the selected end-user devices to execute the actions.

2. A portal aggregator to select an end-user device from a plurality of end-user devices to satisfy a user request, the portal aggregator comprising:
    a computer storage media configured to store data identifying a plurality of device groups, the data identifying each device group comprising data identifying at least one user associated with the device group and data identifying a least one capability for each of a plurality of end-user devices associated with the device group; and
    a processor configured to:
        receive a request from the user, the request comprising information identifying the user, information identifying a first action, information identifying another user, and information identifying a second action;
        identify a first device group associated with the user based on the information identifying the user and a second device group associated with the other user based on the information identifying the other user;
        generate a first list of end-user devices from the first device group having the capability to execute the first action and a second list of end-user devices from the second device group having the capability to execute the second action;
        select an end-user device from the first list of end-user devices to execute the first action and an end-user device from the second list of end-user devices to execute the second action based on a location pattern associated with the user; and
        transmit a command to the selected end-user devices to execute the actions.

3. The portal aggregator according to claim 2, wherein the processor is further configured to:
    periodically receive user information from the user; and
    develop one or more location patterns associated with the user based on the user information.

4. The portal aggregator according to claim 3, wherein the user information comprises information identifying a geographic location of the user.

5. The portal aggregator according to claim 2, wherein the processor is further configured to perform at least one of filtering and sorting on the first list of end-user devices prior to selecting an end-user device from the first list of end-user devices.

6. The portal aggregator according to claim 5, wherein the processor is further configured to receive status information for at least a portion of the end-user devices, wherein the at least one of filtering and sorting is based on the status information.

7. The portal aggregator according to claim 5, wherein the processor is further configured to receive end-user device geographic location information for at least a portion of the end-user devices, wherein the at least one of filtering and sorting is based on the end-user device geographic location information.

8. The portal aggregator according to claim 7, wherein the processor is further configured to receive user geographic location information, wherein the at least one of filtering and sorting is also based on the user geographic location information.

9. The portal aggregator according to claim 5, wherein the processor is further configured to receive storage space information for at least a portion of the end-user devices, wherein the at least one of filtering and sorting is based on the storage space information.

10. The portal aggregator according to claim 2, wherein generating the first list of end-user devices comprises comparing the information identifying the first action to the at least one capability of each of the plurality of end-user devices in the first device group.

11. The portal aggregator according to claim 2, wherein the processor is further configured to:
receive end-user device information for an end-user device; and
associate the end-user device with a device group of the plurality of device groups based on the end-user device information.

12. The portal aggregator according to claim 11, wherein the end-user device information comprises information identifying the at least one capability of the end-user device.

13. The portal aggregator according to claim 11, wherein the end-user device information is manually provided to the processor by a user.

14. The portal aggregator according to claim 11, wherein the end-user device information is provided to the processor by the end-user device.

15. The portal aggregator according to claim 2, wherein at least one device group of the plurality of device groups is associated with at least two users.

16. The portal aggregator according to claim 2, wherein at least two of the device groups of the plurality of device groups comprise the same end-user device.

17. The portal aggregator according to claim 2, wherein at least one device group of the plurality of device groups comprises end-user devices from different vendors.

* * * * *